UNITED STATES PATENT OFFICE.

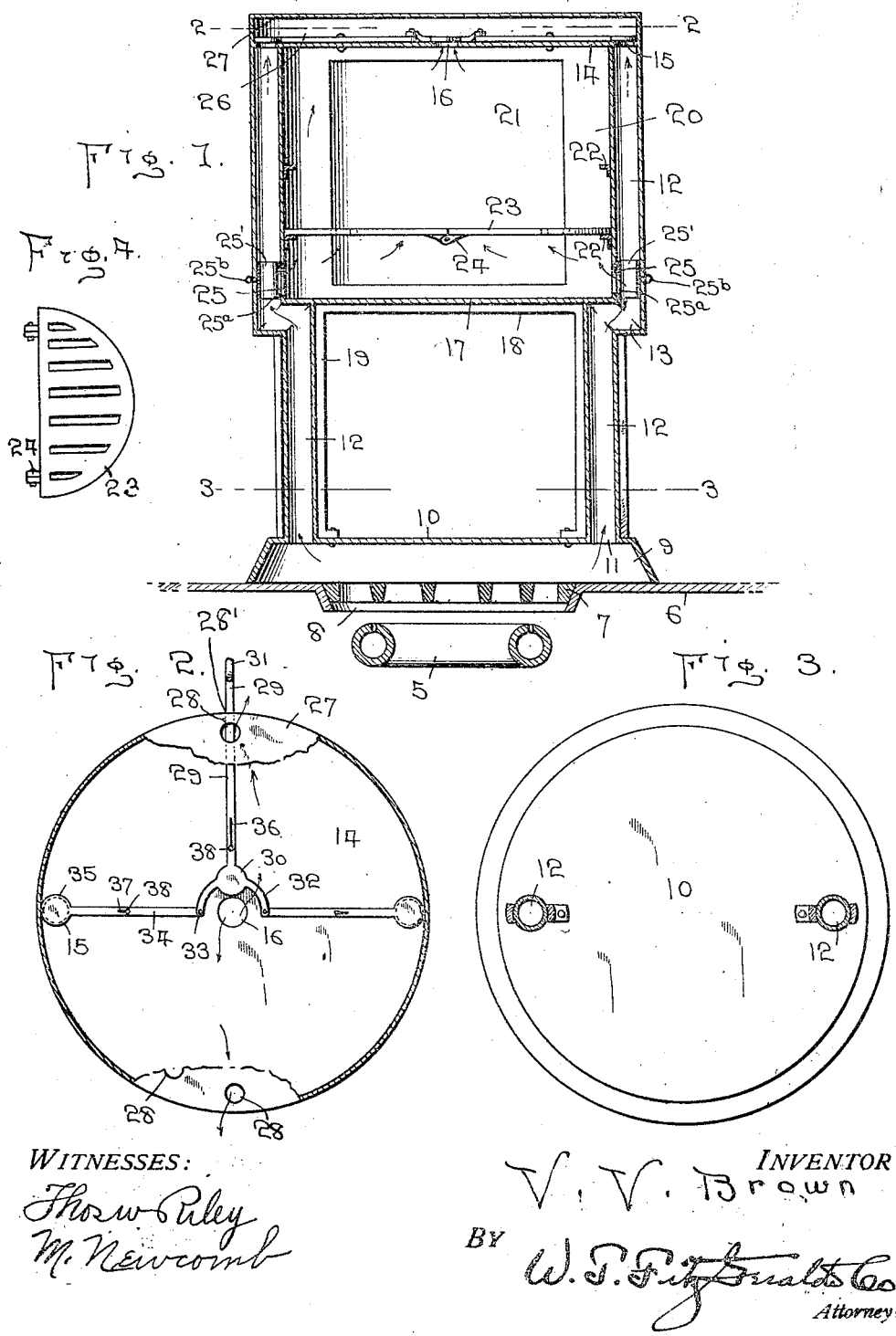

VALETTA V. BROWN, OF BIG FALLS, MINNESOTA.

COOKER.

1,058,288.  Specification of Letters Patent. Patented Apr. 8, 1913.

Application filed May 10, 1912. Serial No. 696,480.

*To all whom it may concern:*

Be it known that I, VALETTA V. BROWN, a citizen of the United States, residing at Big Falls, in the county of Koochiching and State of Minnesota, have invented certain new and useful Improvements in Cookers; and I do hereby declare the following to be a full, clear, and exact description of the invention, such as will enable others skilled in the art to which it appertains to make and use the same.

This invention relates to cookers, and it more particularly relates to an improved form of cooker, comprising an oven associated therewith for conveying heated air thereto from an ordinary stove.

An object of the invention is to provide a device of this character which may be used in connection with any cooking stove of ordinary construction.

A further object of the invention is to provide a device of this character which is particularly adapted for use in connection with fluid or hydro-carbon burners.

A still further object of the invention is to provide a cooker of this character with which the operations of baking, boiling, frying, warming, etc., of foods, may be successfully carried on, at the same time, with one and the same burner.

A still further object is to provide a novel arrangement of heat conveying and controlling members.

A still further object is to provide a novel form of grate, which is especially adapted to use with this form of cooker.

A still further object is to provide a cooker of this character by which a very great saving of fuel is accomplished, and in which is combined the maximum of simplicity, economy and efficiency.

Other objects and advantages may be recited hereinafter and in the claims.

In the accompanying drawings which form a part of this application, Figure 1 is a vertical sectional view through a fragmental portion of a hydro-carbon burner of an improved cooker seated over a stove-opening above the burner. Fig. 2 is a horizontal fragmental and sectional view on the line 2—2 of Fig. 1, showing the arrangement of dampers above the oven, and, Fig. 3 is a horizontal sectional view on the line 3—3 of Fig. 1, and, Fig. 4 is a plan view of the oven grate folded on its hinges.

Referring to the drawings in which similar reference characters designate corresponding parts throughout the several views, a hydro-carbon burner of ordinary construction is indicated by the numeral 5, said burner being a portion of a stove of which the numeral 6 indicates the top and the numeral 7 indicates the grate, seated within the stove opening 8. The base flange 9 of my improved cooker is preferably of hollow frusto-conical formation, and the periphery of the base flange 9 is united with a base plate 10. This base plate is provided with openings 11, in its upper surface, and heated air conduits 12 communicate with the openings 11, extending vertically therefrom for approximately half of their length, their medial portion being turned horizontally at 13, thence extending vertically to the top oven plate 14, the latter being apertured at 15, forming ports which are in communication with the heated-air conduits 12. The top oven plate is also apertured centrally at 16, so as to form a hot-air port.

The bottom oven plate 17 is seated upon the tops of the lower sections of the heated-air conduits 12, over the horizontal portions of said conduits. The oven bottom 17 is preferably supported by a girder 18, the ends of the girder being supported on posts 19, the latter being secured to the base plate 10, by any proper means. The girder and posts are preferably formed from a length of bar-iron, bent into substantially U-shape, or it may be formed from cast-iron or sheet metal, as preferred.

The oven is preferably cylindrical, the side walls 20 thereof being united with the bottom 17 and the top plate 14, a door 21 being provided, of any proper form, and arranged to be opened and closed in any proper manner or by any proper means. The wall 20 is provided with supporting lugs 22, on which is seated a grate 23, the latter being formed in two semi-circular halves, hinged together at 24 and thereby being adapted to be folded together for removal, replacement and adjustment relative to the oven. The bottom portions of the side walls 20 are provided with apertures 25, communicating with the upper sections of the conduits 12; so that the heated-air from the air conduits enters the oven and passes through the grate 23, and the heat therefrom is partially absorbed by the food which is supported by said grate. A damper 25' is rotatably mounted in each conduit 12, being provided with an aperture 25ª, adapted to be turned into and out of registry with the aperture 25, by means of a knob 25ᵇ. This form of damper, being of ordinary construction, is not described in further detail. The openings between the bars of grate 23 are relatively small or narrow, their combined capacity being approximately equal to that of the conduits, so that all of the heated-air cannot pass directly upward from the apertures 25; but a considerable portion of the air is directed toward the central portion of the oven, as indicated by the arrows under the grate 23. Therefore, the heat is thoroughly distributed in all parts of the oven. After passing through the oven, the heated-air continues upward through the port 16, into the warm-air chamber 26, and is caused to spread laterally by means of the warming plate or crown 27. The crown 27 is provided with outlet apertures 28, any desired number of which may be employed, but which are preferably equally spaced around the outer edge portion of the crown. The upper side wall 20 is apertured at 28', and the arm 29 of a damper member 30 extends through the aperture 28', being slidably seated therein; a handle 31 being provided for sliding the arm 29 and moving the damper 30 over the central port 16. The damper 30 is provided with laterally and rearwardly curved arms 32, which are pivoted at 33 to the damper levers 34; the latter being united with dampers 35, for opening and closing the ports 15. The arms 29 and 34 are slotted at 36 and 37 respectively, for the reception of headed pins or studs 38, secured to the top oven plate 14.

In operation, when it is desired to fry an article of food, a frying pan or the like, (not shown), containing the article of food to be fried, may be placed upon the base-plate 10, and the heat will be conducted thereto through the medium of the plate 10 and the bottom of the cooking utensil. When it is desired to bake or roast an article of food, within the oven, the same is placed upon the plate 17 or upon the grate 23, and the handle 31 is manipulated so as to regulate the damper members, by which the central port 16 may be closed, while simultaneously opening the ports 15 or vice versa. When the port 16 is opened the intensity of the heat within the oven is increased, while if the ports 15 are opened and the port 16 closed, the heated-air will pass around the oven, only imparting a small quantity of heat thereto. However, the ports 15 and 16 may be partly closed and partly opened, when it is desired to bake or roast an article of food slowly; and it is obvious that the heat within the oven may be regulated perfectly, by proper manipulation of the dampers. I may also utilize the concavo-convexed base flange for heating sad-irons, by seating their under surfaces against the inclined outer surface of the base flange.

It is obvious that I have provided a device of this character which is fully capable of attaining the foregoing objects, and in a thoroughly practical and efficient manner.

I do not limit my invention to the exact details of construction, combination and arrangement of parts, as herewith described and illustrated, but my invention may only be limited by a reasonable interpretation of the following claims.

What I claim is:

1. In a cooker, an oven having a door and having grate-supporting lugs on its wall, and a grate comprising a pair of similar grate members hinged together and supported by the hinge at the middle of the grate and adapted to normally rest upon the lugs and to be folded together for removal through the door, substantially as shown and specified.

2. In a cooker, an oven having an apertured top, conduits for conveying heated air into the oven, a chamber above the oven and separated therefrom by the top of the oven, said conduits being provided with ports for establishing communication between the conduits and the chamber, and a damper mechanism pivotally connected to the oven top within the chamber and including means extending outside of the chamber for simultaneously opening the aperture of the oven top and closing the ports through which the chamber and conduits communicate.

In testimony whereof I have signed my name to this specification in the presence of two subscribing witnesses.

VALETTA V. BROWN.

Witnesses:
A. E. PETERSON,
A. E. SOLBERG.